US010873769B2

(12) United States Patent
Zhong et al.

(10) Patent No.: US 10,873,769 B2
(45) Date of Patent: Dec. 22, 2020

(54) LIVE BROADCASTING METHOD, METHOD FOR PRESENTING LIVE BROADCASTING DATA STREAM, AND TERMINAL

(71) Applicant: TENCENT TECHNOLOGY (SHENZHEN) COMPANY LIMITED, Shenzhen (CN)

(72) Inventors: Qinghua Zhong, Shenzhen (CN); Kun Lu, Shenzhen (CN); Haoqi Kuang, Shenzhen (CN); Dili Fu, Shenzhen (CN); Ying Zhu, Shenzhen (CN); Guochen Zeng, Shenzhen (CN); Yinglei Liang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 52 days.

(21) Appl. No.: 16/248,023

(22) Filed: Jan. 15, 2019

(65) Prior Publication Data

US 2019/0149852 A1 May 16, 2019

Related U.S. Application Data

(63) Continuation of application No. PCT/CN2017/092885, filed on Jul. 14, 2017.

(30) Foreign Application Priority Data

Jul. 15, 2016 (CN) .......................... 2016 1 0561875

(51) Int. Cl.
*H04N 21/2187* (2011.01)
*H04N 21/431* (2011.01)
(Continued)

(52) U.S. Cl.
CPC ..... *H04N 21/2187* (2013.01); *H04L 12/1822* (2013.01); *H04L 65/4076* (2013.01);
(Continued)

(58) Field of Classification Search
None
See application file for complete search history.

(56) References Cited

U.S. PATENT DOCUMENTS

| 9,583,142 | B1* | 2/2017 | Zhu ..................... H04N 21/8549 |
| 2005/0208962 | A1* | 9/2005 | Kim ....................... H04N 7/147 455/550.1 |

(Continued)

FOREIGN PATENT DOCUMENTS

| CN | 102668554 A | 9/2012 |
| CN | 103634681 A | 3/2014 |

(Continued)

OTHER PUBLICATIONS

The World Intellectual Property Organization (WIPO) International Search Report for PCT/CN2017/092885 dated Sep. 30, 2017 6 Pages (including translation).

*Primary Examiner* — Alexander Q Huerta
(74) *Attorney, Agent, or Firm* — Anova Law Group, PLLC

(57) ABSTRACT

A live broadcasting method is provided. A computing device corresponding to a first user identifier participating a group session displays a group session interface. The computing device obtains a group live broadcasting initiation instruction based on the group session interface; collects a live broadcasting data stream according to the group live broadcasting initiation instruction; and plays the live broadcasting data stream on the group session interface. The live broadcasting data stream is sent to a terminal corresponding to a second user identifier participating in the group session.

20 Claims, 11 Drawing Sheets

(51) Int. Cl.
*H04N 21/4788* (2011.01)
*H04N 21/658* (2011.01)
*H04L 29/06* (2006.01)
*H04L 12/18* (2006.01)
*H04L 29/08* (2006.01)

(52) U.S. Cl.
CPC ......... *H04L 67/14* (2013.01); *H04N 21/4316* (2013.01); *H04N 21/4788* (2013.01); *H04N 21/6581* (2013.01)

(56) References Cited

U.S. PATENT DOCUMENTS

| | | | |
|---|---|---|---|
| 2006/0136960 A1* | 6/2006 | Morris | H04H 60/33 725/13 |
| 2006/0224761 A1 | 10/2006 | Howarth et al. | |
| 2009/0232129 A1* | 9/2009 | Wong | H04L 65/1089 370/352 |
| 2009/0287790 A1* | 11/2009 | Upton | H04N 7/17318 709/208 |
| 2011/0145881 A1* | 6/2011 | Hartman | H04N 21/4438 725/118 |
| 2012/0092438 A1* | 4/2012 | Guzman Suarez | H04N 7/15 348/14.03 |
| 2014/0132702 A1* | 5/2014 | Leibovich | H04N 21/4788 348/14.08 |
| 2016/0007052 A1* | 1/2016 | Haitsuka | H04N 21/41407 725/115 |
| 2016/0007067 A1* | 1/2016 | Lai | H04N 21/4126 725/62 |
| 2016/0275952 A1* | 9/2016 | Kashtan | H04M 3/569 |
| 2016/0373693 A1* | 12/2016 | Segal | H04N 21/47 |
| 2017/0318261 A1* | 11/2017 | Dalvi | G06T 19/006 |
| 2017/0373868 A1* | 12/2017 | Deets, Jr. | H04N 7/147 |
| 2019/0045254 A1* | 2/2019 | Hunacek | H04L 67/2842 |
| 2019/0110105 A1* | 4/2019 | Chen | H04N 21/4627 |
| 2019/0124021 A1* | 4/2019 | DeMattei | G06F 3/0488 |

FOREIGN PATENT DOCUMENTS

| CN | 105657326 A | 6/2016 |
|---|---|---|
| CN | 106254311 A | 12/2016 |

\* cited by examiner

LIVE BROADCASTING METHOD, METHOD FOR PRESENTING LIVE BROADCASTING DATA STREAM, AND TERMINAL

RELATED APPLICATIONS

This application is a continuation application of PCT Patent Application No. PCT/CN2017/092885, filed on Jul. 14, 2017, which claims priority to Chinese Patent Application No. 201610561875.8, entitled "LIVE BROADCASTING METHOD, METHOD FOR PRESENTING LIVE BROADCASTING DATA STREAM, AND TERMINAL" filed with the Chinese Patent Office on Jul. 15, 2016, the entire contents of both of which are incorporated herein by reference.

FIELD OF TECHNOLOGY

This application relates to the field of Internet technologies, and in particular, to a live broadcasting method and apparatus, and a method and an apparatus for presenting a live broadcasting data stream.

BACKGROUND OF THE DISCLOSURE

With the improvement of network infrastructures and upgrade of terminal hardware, live broadcasting becomes a hot interaction manner. Currently, a user may apply for becoming an anchor on a live broadcasting platform and create a virtual live broadcasting room, and then other users may join in the live broadcasting room by using an entrance of the live broadcasting room provided by the live broadcasting platform. The anchor may share a live broadcasting data stream in the live broadcasting room, so that all users in the live broadcasting room can watch the live broadcasting data stream shared by the anchor.

However, a manner of live broadcasting by using a live broadcasting room is a passive interaction manner. After the anchor opens the live broadcasting room, other users need to actively find an entrance to the live broadcasting room. However, joining in the live broadcasting room by using the entrance leads to low interaction efficiency of the manner of living broadcasting by using a live broadcasting room.

SUMMARY

According to various embodiments of this application, a live broadcasting method and apparatus, and a method and an apparatus for presenting a live broadcasting data stream are provided.

A live broadcasting method includes: displaying, by a computing device corresponding to a first user identifier participating a group session, a group session interface. The computing device obtains a group live broadcasting initiation instruction based on the group session interface; collects a live broadcasting data stream according to the group live broadcasting initiation instruction; and plays the live broadcasting data stream on the group session interface. The live broadcasting data stream is sent to a terminal corresponding to a second user identifier participating in the group session.

A method for presenting a live broadcasting data stream includes: displaying, by a computing device participating a group session, a group session interface; and receiving a live broadcasting data stream initiated by a terminal corresponding to a first user identifier. The first user identifier is a user identifier initiating a live broadcast among participators of the group session. The method further includes: playing the live broadcasting data stream on the group session interface.

A live broadcasting apparatus, comprising a memory and a processor, the memory storing computer readable instructions, and the computer readable instructions, when being executed by the processor, causing the processor to perform: displaying a group session interface. The apparatus corresponds to a first user identifier participating a group session. The computer readable instructions further make the processor to obtain a group live broadcasting initiation instruction based on the group session interface; collect a live broadcasting data stream according to the group live broadcasting initiation instruction; and play the live broadcasting data stream on the group session interface. The live broadcasting data stream is sent to a terminal corresponding to a second user identifier participating in the group session.

An apparatus for presenting a live broadcasting data stream, comprising a memory and a processor, the memory storing computer readable instructions, and the computer readable instructions, when being executed by the processor, causing the processor to perform: displaying a group session interface of a group session participated by the apparatus; and receiving a live broadcasting data stream initiated by a terminal corresponding to a first user identifier. The first user identifier is a user identifier initiating a live broadcast among participators of the group session. The computer readable instructions further make the processor to play the live broadcasting data stream on the group session interface.

Details of one or more embodiments of this application are provided in the following accompanying drawings and descriptions. Other features and advantages of this application become more obvious with reference to the specification, the accompanying drawings, and the claims.

BRIEF DESCRIPTION OF THE DRAWINGS

To describe the technical solutions in the embodiments of this application more clearly, the following briefly describes the accompanying drawings that need to be used in the embodiments. Apparently, the accompanying drawings in the following descriptions show merely some embodiments of this application, and a person of ordinary skill in the art may still derive other drawings from these accompanying drawings without creative efforts.

DESCRIPTION OF EMBODIMENTS

To make the technical solutions and advantages of this application clearer and more comprehensible, the following further describes this application in detail with reference to the accompanying drawings and embodiments. It should be understood that the specific embodiments described herein are merely used for explaining this application but are not intended to limit this application.

It can be understood that terms "first", "second", and the like used in this application may be used in this text for describing various elements, but these elements are not limited by these terms. These terms are merely used for distinguishing a first element from another element. For example, a first user identifier and a second user identifier are both user identifiers but are not the same second user identifier.

Figure 1:
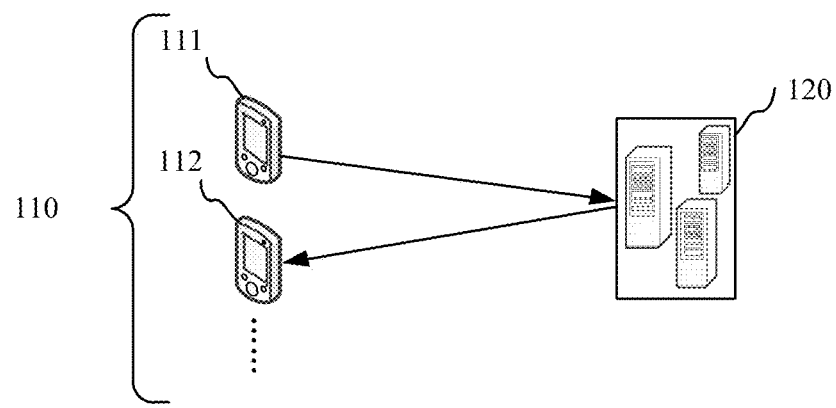
FIG. 1 is a diagram of an application environment of a live broadcasting system according to an embodiment.

FIG. 1 is a diagram of an application environment of a live broadcasting system according to an embodiment. As shown in FIG. 1, the live broadcasting system includes a terminal 110 and a server 120. The terminal 110 includes at least a first terminal 111 and a second terminal 112. The first terminal 111 and the second terminal 112 may be terminals of the same type or different types. The first terminal 111 may initiate a live broadcasting data stream in a group session, and the second terminal 112 receives the live broadcasting data stream and plays the live broadcasting data stream in a group session interface. The terminal 110 is connected to the server 120 by using a network, and terminals in the terminal 110 may interact with each other by using the server 120.

Figure 2:
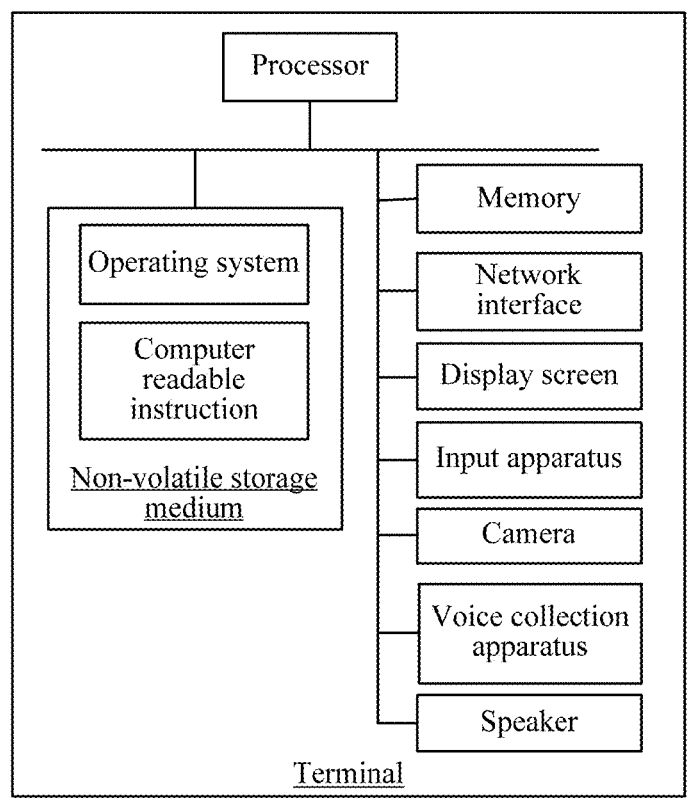
FIG. 2 is a schematic diagram of an internal structure of a terminal according to an embodiment.

FIG. 2 is a schematic diagram of an internal structure of a terminal according to an embodiment. As shown in FIG. 2, the terminal includes a processor, a non-volatile storage medium, a memory, a network interface, a voice collection apparatus, a speaker, a display screen, a camera, and an input apparatus that are connected by using a system bus. The non-volatile storage medium of the terminal stores an operating system and may also store computer readable instructions. When being processed by the processor, the computer readable instructions may make the processor perform a live broadcasting method and/or a method for presenting a live broadcasting data stream. The processor of the terminal is configured to provide computing and control capabilities, to support running of the entire terminal. The memory in the terminal may store computer readable instructions. When being executed by the processor, the computer readable instructions may make the processor perform a live broadcasting method and/or a method for presenting a live broadcasting data stream. The network interface is configured to perform network communication with the server, for example, send a live broadcasting data stream to the server and receive a live broadcasting data stream sent by the server. The display screen of the terminal may be a liquid crystal display screen, an e-ink display screen, or the like. The input apparatus may be a touch layer covering the display screen, or may be a key, a track ball, or a touchpad disposed on a housing of the terminal, or may be an external keyboard, touchpad, or mouse. The terminal may be a mobile phone, a tablet computer, a personal digital assistant, a wearable device, or the like. A person skilled in the art can understand that in the structure shown in FIG. 2, only a block diagram of a partial structure related to a solution in this disclosure is shown, and does not constitute a limit to the terminal to which the solution in this disclosure is applied. Specifically, the terminal may include more components or fewer components than those shown in the figure, or some components may be combined, or a different component deployment may be used.

Figure 3:
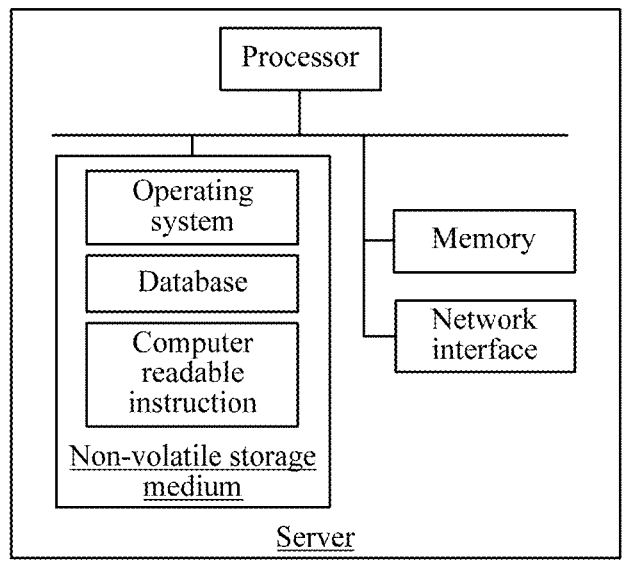
FIG. 3 is a schematic diagram of an internal structure of a server according to an embodiment.

FIG. 3 is a schematic diagram of an internal structure of a server according to an embodiment. As shown in FIG. 3, the server includes a processor, a non-volatile storage medium, a memory, and a network interface that are connected by using a system bus. The non-volatile storage medium of the server stores an operating system, a database, and computer readable instructions. The computer readable instructions are used for performing a live broadcasting method applicable to the server. The processor of the server is configured to provide computing and control capabilities to support running of the entire server. The memory of the server may store computer readable instructions. When being executed by the processor, the computer readable instructions may make the processor perform a live broadcasting method. The network interface of the server is configured to connect to and communicate with an external terminal by using a network according to the method. The server may be implemented by using an independent server or a server cluster including multiple servers. A person skilled in the art may understand that in the structure shown in FIG. 3, only a block diagram of a partial structure related to a solution in this application is shown, and does not constitute a limit to the server to which the solution in this application is applied. Specifically, the server may include more components or fewer components than those shown in the figure, or some components may be combined, or a different component deployment may be used.

Figure 4:
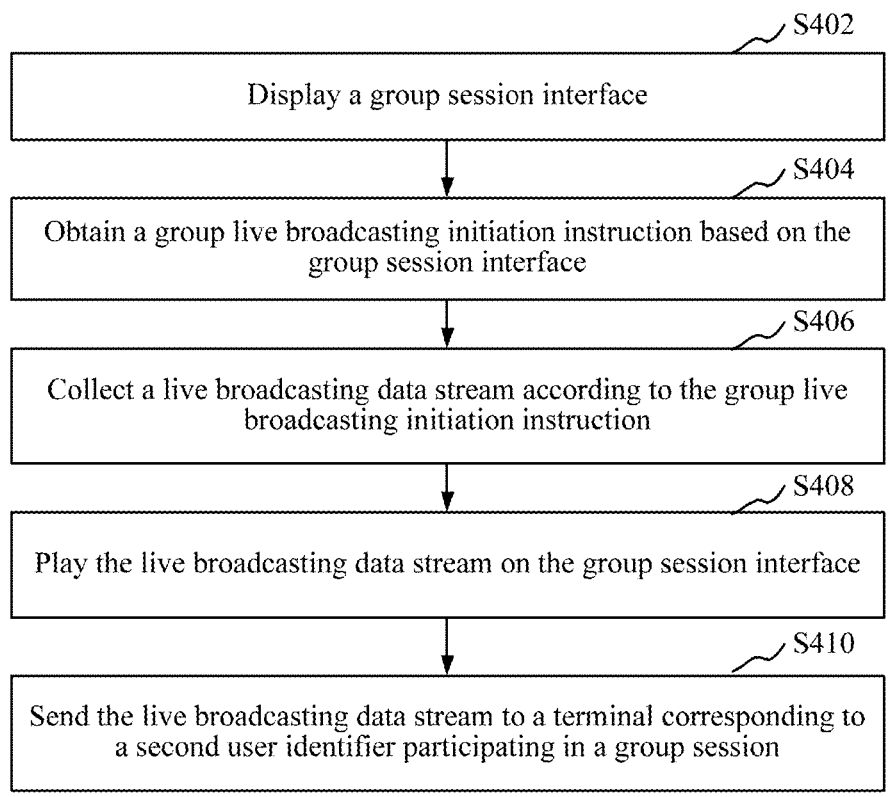
FIG. 4 is a schematic flowchart of a live broadcasting method according to an embodiment.

FIG. 4 is a schematic flowchart of a live broadcasting method according to an embodiment. This embodiment is described by using an example in which the method is applied to the first terminal 111 in FIG. 1. Referring to FIG. 4, the live broadcasting method specifically includes the following steps:

S402: Display a group session interface. The group session interface may be displayed by a computing device corresponding to a first user identifier participating a group session.

In an embodiment, step S402 includes: displaying the group session interface for presenting a message generated in a session of a group, a local first user identifier and a second user identifier belonging to the same group as the first user identifier participating in the session.

The group is a user collection of more than one user identifier, and group members represented by the user identifiers in the group may perform information sharing and message interaction according to the group. The group session interface is a human-machine interaction interface provided by an application that has a group function. The interface may be referred to as the group session interface. The application may be an instant messaging application, a social network application, or a short messaging service application. The group may be a chat group or a discussion group. The group may be a stable group that exists for a long term once established or may be a temporary group that is dismissed after an expiry date.

Further, the session of the group refers to a process of interaction that is performed by at least one member and other members in the group. All members in an online state in the group may participate in the session of the group. The first user identifier and the second user identifier are both user identifiers, and descriptions of the first user identifier and the second user identifier are used for distinguishing different user identifiers. The first user identifier and the second user identifier both belong to the group to which the session belongs, that is, are both members of the group. The first user identifier is a unique identifier of a first user indicating using of a first terminal, and the second user identifier is a unique identifier of a second user indicating using of a second terminal. There may be one or more second users, and correspondingly, there may be one or more second user identifiers.

The message generated in the session of the group may include a message sent by any member in the group in the session. In an embodiment, the message generated in the session includes at least one of a text message, an audio message, a video message, a picture message, and a red packet message. The text message is a message whose message content is a text. The audio message is a message capable of playing audio data, and the audio message may include the audio data itself or a link address for downloading the audio data. The video message is a message capable of playing a video, and the video message may include the video itself or a link address for downloading the video. The picture message may be a message including a picture, a link address of a picture, or a pre-appointed picture identifier. The link address of the picture may be used for downloading the corresponding picture, and the pre-appointed picture identifier may be used for downloading or locally selecting the corresponding picture. The picture may be a picture uploaded by a user or a picture existing on a server, and the picture may be a sticker picture. The red packet message may be operated and may trigger a resource transfer message after being operated. A resource is, for example, money, integrals, game coins, or physical prizes, and resource transfer is, for example, transfer of money, integrals, or game coins from one account to another account, or is, for example, change of owners of physical prizes. The messages generated in the group session may be displayed by any terminal corresponding to a group session participator on the group session interface. In some embodiments, the messages are rendered in a message container layer of the group session interface.

S404: Obtain a group live broadcasting initiation instruction based on the group session interface.

The group live broadcasting initiation instruction is an instruction for triggering a live broadcasting function in the group. The first terminal may obtain the group live broadcasting initiation instruction triggered in the group session interface. The group session interface is used for presenting the message generated in the session of the group. The first terminal may detect a predefined trigger operation on the group, and trigger the corresponding group live broadcasting initiation instruction when detecting the trigger operation. The trigger operation may be an operation on a control in the group session interface, for example, a touch operation or a cursor clicking operation on the control. The trigger operation may alternatively be a click on a predefined physical key or a shaking operation triggered when the group session interface for presenting the message generated in the session of the group is displayed. The group live broadcasting initiation instruction corresponds to the local first user identifier of the first terminal, indicating that a live broadcast is initiated by the first user.

Figure 5:
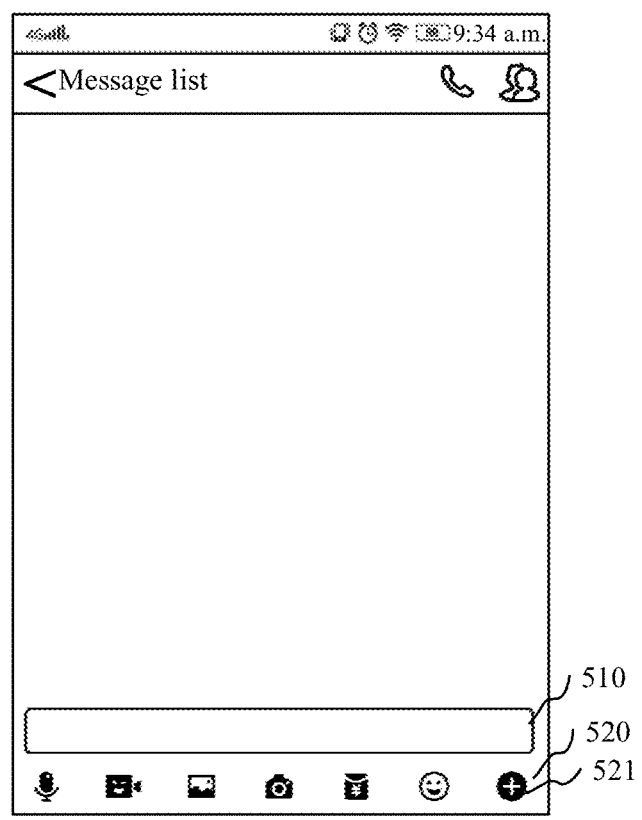
FIG. 5 is a schematic diagram of a group session interface according to an embodiment.
Figure 6:
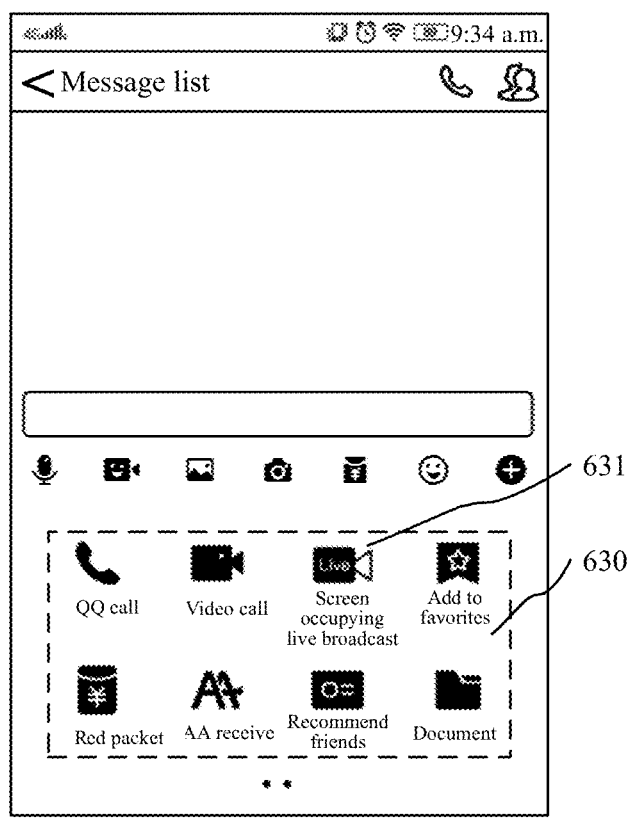
FIG. 6 is a schematic diagram of a group session interface according to another embodiment.

For example, referring to FIG. 5, FIG. 5 is a schematic diagram of a group session interface according to an embodiment. The group session interface includes a message input box 510 and a toolbar 520. The toolbar 520 includes an expanded toolbar entrance 521. Referring to FIG. 6, FIG. 6 a schematic diagram of a group session interface according to another embodiment. When a user clicks the expanded toolbar entrance 521 in the group session interface shown in FIG. 5, the first terminal presents an expanded toolbar 630 in the group session interface shown in FIG. 6, and the expanded toolbar 630 includes a live broadcasting trigger control 631. When the clicks the live broadcasting trigger control 631, the first terminal obtains the corresponding group live broadcasting initiation instruction.

S406: Collect a live broadcasting data stream according to the group live broadcasting initiation instruction.

The live broadcasting data stream is a continuous data stream required by continuous live broadcasting, and the live broadcasting data stream may include an image data stream and may also include an audio data stream. Specifically, after obtaining the group live broadcasting initiation instruction, the first terminal makes a response to the group live broadcasting initiation instruction and calls a local camera image collection sequence to form an image data stream and call a local voice collection apparatus to collect an environment voice to form an audio data stream, so as to collect the live broadcasting data stream including the image data stream and the audio data stream.

S408: Play the live broadcasting data stream on the group session interface.

In an embodiment, step S408 includes: using the live broadcasting data stream as a background of the group session interface.

Specifically, the live broadcasting data stream includes the image data stream. The image data stream includes an image frame sequence. The first terminal uses the image frame sequence as the background of the group session interface frame by frame for playing, so that the image frame sequence forms a live broadcasting video. When playing the image frame sequence of the image data stream frame by frame, the first terminal may also synchronously play the audio data stream in the live broadcasting data stream. When playing the live broadcasting data stream, the first terminal may also present a microphone on/off control and/or a live broadcasting on/off control, turn on or turn off a microphone according to an operation on the microphone on/off control, and turn on or turn off, according to an operation on the live broadcasting on/off control, playing performed by using the live broadcasting data stream as the background of the group session interface.

S410: Send the live broadcasting data stream to a terminal corresponding to a second user identifier participating in a group session. In some embodiments, the live broadcasting data stream is sent to the terminal via the server when the terminal corresponding to the second user identifier participating in the group session is connected to a network other than a mobile data network; and a screenshot captured from the live broadcasting data stream is sent to the terminal via the server when the terminal is connected to a mobile data network.

Specifically, the first terminal may send the live broadcasting data stream to the server, so that the server sends the live broadcasting data stream to the terminal corresponding to the second user identifier. The first terminal sends the live broadcasting data stream to the server, and the server may sample and encode the live broadcasting data stream and then generate a low-fidelity live broadcasting data stream, and send the low-fidelity live broadcasting data stream to the second terminal corresponding to the second user identifier. Low fidelity is fidelity lower than fidelity of the live broadcasting data stream that is sent by the first terminal to the server. Fidelity is a quantization value for measuring similarity between the sampled and encoded live broadcasting data stream and the original live broadcasting data stream before the sampling and encoding. Higher fidelity indicates higher similarity and less loss of video stream picture quality after the sampling and encoding. Lower fidelity indicates lower similarity and greater loss of the video stream picture quality after the sampling and encoding.

In an embodiment, the first terminal may send the live broadcasting data stream, a group identifier, and the first user identifier to the server, so that the server determines the second user identifier according to the group identifier and the first user identifier, so as to distribute the live broadcasting data stream to the second terminal corresponding to the second user identifier. In an embodiment, the first terminal may alternatively send the live broadcasting data stream and the second user identifier to the server, so that the server sends the live broadcasting data stream to the second terminal corresponding to the second user identifier according to the carried second user identifier.

In the foregoing live broadcasting method, users participating in the group session implement live broadcasting interaction based on a group, and the users participating in the group session may all perform the live broadcasting interaction, thereby improving efficiency of the live broadcasting interaction. The users can not only perform asynchronous session interaction in a message form based on a group but also synchronously perform the live broadcasting interaction, thereby enriching user interaction forms and improving efficiency of information transfer between group users.

In an embodiment, after step S404, the method further includes: reducing an area of a message container in the group session interface, where the message container is used for presenting a message generated by the group session. In other words, the message container in the group session interface may occupy a first area when the group live broadcasting is not initiated, and occupy a second area smaller than the first area when collecting and playing the live broadcasting data stream.

Figure 7:
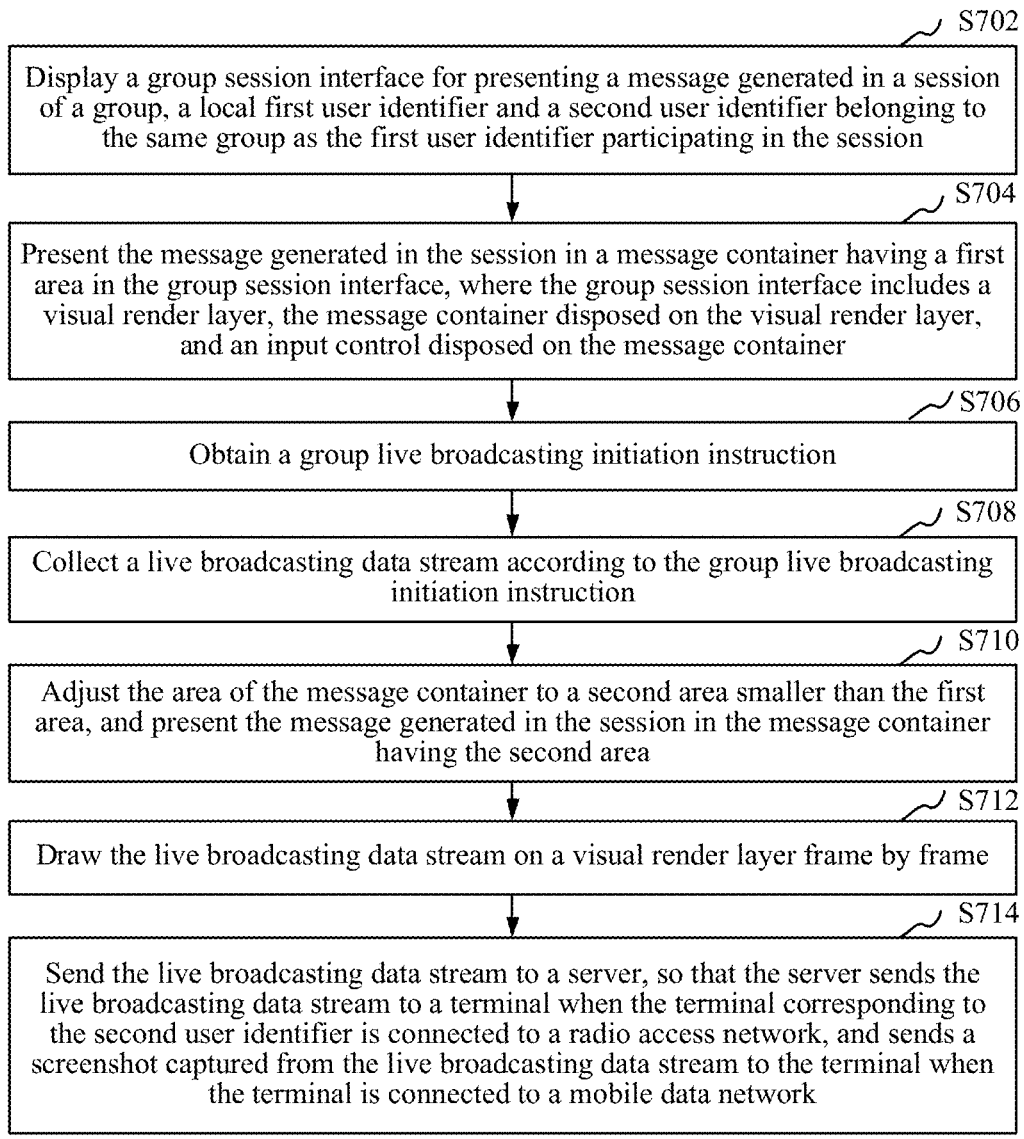
FIG. 7 is a schematic flowchart of a live broadcasting method according to another embodiment.

FIG. 7 is a schematic flowchart of a live broadcasting method according to another embodiment. As shown in FIG. 7, the live broadcasting method specifically includes the following steps:

S702: Display a group session interface for presenting a message generated in a session of a group, a local first user identifier and a second user identifier belonging to the same group as the first user identifier participating in the session.

S704: Present the message generated in the session in a message container having a first area in the group session interface. The group session interface includes a visual rendering layer, the message container disposed on the visual rendering layer, and an input control disposed on the message container.

The message container is a layer for containing the message generated in the session of the group, and the area of the message container is the first area. The message container may be rectangular, or round, or of an irregular shape. A region for presenting the message in the message container may be non-transparent, a region other than the region for presenting the message in the message container may be transparent or semi-transparent. The visual rendering layer is a layer for rendering a background of the group session interface. The input control is a control for inputting data, for example, a message input box 510 and a toolbar 520 in the group session interface shown in FIG. 5.

S706: Obtain a group live broadcasting initiation instruction.

S708: Collect a live broadcasting data stream according to the group live broadcasting initiation instruction.

S710: Adjust the area of the message container to a second area smaller than the first area, and present the message generated in the session in the message container having the second area.

Step S710 is performed before or after step S708. A first terminal may reduce the message container according to the group live broadcasting initiation instruction, and the area of the reduced message container is the second area. Reducing of the message container may be specifically decreasing of the height and/or width of the message container. In this embodiment, the message generated in the session is presented in the message container having the second area, so that a sufficient spare region can be prepared to present the live broadcasting data stream.

In an embodiment, the first terminal presents in the message container having the second area messages that are already generated and are subsequently generated in the session. In the messages generated in the session, messages whose message times are closer to a current time display higher priority in the message container. The message time may be a message sending time or a message receiving time. If an area occupied by messages contained in the message container having the first area is greater than the second area, the first terminal may hide or delete messages with low priority in the message container having the first area according to the second area. In this embodiment, the messages with low priority are hidden or deleted, ensuring a sufficient spare region for presenting the live broadcasting data stream and also ensuring that a latest message can be presented.

In an embodiment, in the first terminal, along a direction of the message container having the second area to a region in which the message container is originally located but in which the message container is not located after being reduced, messages presented in the message container having the second area gradually become transparent. In this embodiment, in a region that gradually becomes transparent, a user can not only see the played live broadcasting data stream but also check the messages, so as to transfer a larger amount of information.

S712: Draw the live broadcasting data stream on a visual rendering layer frame by frame.

Specifically, the group session interface includes the visual rendering layer, the message container disposed on the visual rendering layer, and the input control disposed on the message container. The input control may be configured to trigger a message, the message container may be configured to present the message, and the visual rendering layer may be configured to present a background. The first terminal re-draws an image frame sequence in the live broadcasting data stream frame by frame on the visual rendering layer, to use the live broadcasting data stream as a background of the group session interface for playing, so as to play the live broadcasting data stream on the group session interface. In this embodiment, the group session interface is divided into different layers, and message triggering, message presentation, and playing of the live broadcasting data stream are separated, to facilitate message presentation and playing of the live broadcasting data stream.

S714: Send the live broadcasting data stream to a server, so that the server sends the live broadcasting data stream to a terminal when the terminal corresponding to the second user identifier is connected to a radio access network, and sends a screenshot captured from the live broadcasting data stream to the terminal when the terminal is connected to a mobile data network.

Specifically, the first terminal sends the live broadcasting data stream to the server, and the server may detect a network state of a second terminal corresponding to the second user identifier. If it is detected that the network state of the second terminal is being connected to the radio access network (e.g., a wireless network other than mobile data network) or being connected to a network in a wired manner, the live broadcasting data stream is directly sent to the second terminal. If it is detected that the network state of the second terminal is being connected to the mobile data network, the screenshot captured from the live broadcasting data stream is sent to the second terminal.

The screenshot may be any one or more image frames captured from the live broadcasting data stream, for example, may be the first image frame in the live broadcasting data stream. The screenshot may be captured from the live broadcasting data stream and sent to the second terminal every preset duration for presentation. Gaussian blur processing may be performed on the screenshot. The screenshot may match with a size of a screen of the second terminal. The radio access network may be specifically a network connected in a WiFi manner or a Wireless LAN authentication and privacy infrastructure (WAPI) manner. The mobile data network is a data network of a standard such as 2G (the second generation of mobile communication technology), 3G, or 4G.

In the foregoing live broadcasting method, the message generated in the session is presented in the message container having the second area, so that a sufficient spare region can be prepared to present the live broadcasting data stream. The group session interface is divided into different layers, and message triggering, message presentation, and playing of the live broadcasting data stream are separated, to facilitate message presentation and playing of the live broadcasting data stream. The live broadcasting data stream or the screenshot of the live broadcasting data stream may also be pushed according to different network states of the second terminal. This is applicable to live broadcasting requirements of the second terminal in different network states.

Figure 8:
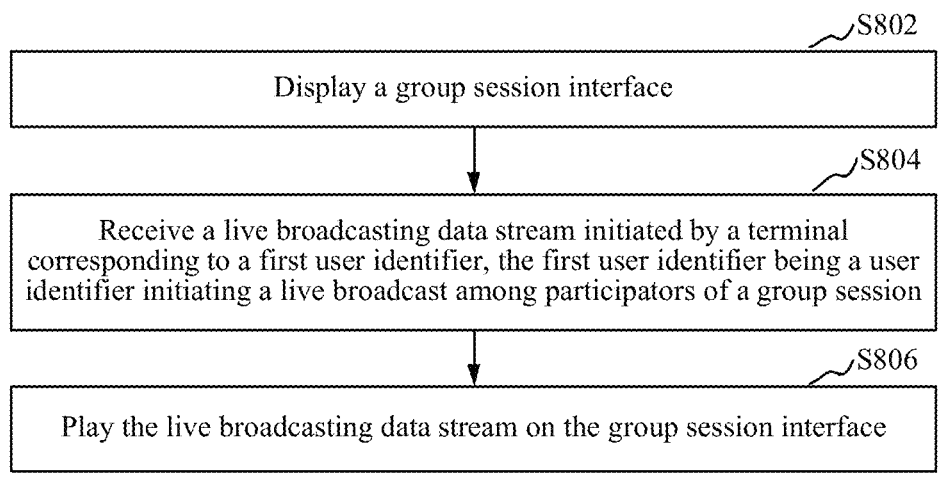
FIG. 8 is a schematic flowchart of a method for presenting a live broadcasting data stream according to an embodiment.

FIG. 8 is a schematic flowchart of a method for presenting a live broadcasting data stream according to an embodiment. This embodiment is described by using an example in which the method is applied to the second terminal 112 in FIG. 1. Referring to FIG. 8, the method for presenting a live broadcasting data stream specifically includes the following steps:

S802: Display a group session interface.

In an embodiment, step S802 includes: displaying the group session interface for presenting a message generated in a session of a group, a first user identifier initiating a live broadcast and a local second user identifier belonging to the same group as the first user identifier participating in the session.

The group is a user collection of more than one user identifier, and group members represented by the user identifiers in the group may perform information sharing and message interaction according to the group. The group session interface is a human-machine interaction interface provided by an application that has a group function. The application may be an instant messaging application, a social network application, or a short messaging service application. The group may be a chat group or a discussion group. The group may be a stable group that exists for a long term once established or may be a temporary group that is dismissed after an expiry date.

Further, the session of the group refers to a process of interaction that is performed by at least one member and other members in the group. All members in an online state in the group may participate in the session of the group. The first user identifier and the second user identifier are both user identifiers, and descriptions of the first user identifier and the second user identifier are used for distinguishing different user identifiers. The first user identifier and the second user identifier both belong to the group to which the session belongs, that is, are both members of the group. The first user identifier is a unique identifier of a first user indicating using of a first terminal, and the second user identifier is a unique identifier of a second user indicating using of a second terminal. There may be one or more second users, and correspondingly, there may be one or more second user identifiers.

The message generated in the session of the group may include a message sent by any member in the group in the session. In an embodiment, the message generated in the session includes at least one of a text message, an audio message, a video message, a picture message, and a red packet message. The text message is a message whose message content is a text. The audio message is a message capable of playing audio data. The audio message may include the audio data itself or a link address for downloading the audio data. The video message is a message capable of playing a video, and the video message may include the video itself or a link address for downloading the video. The picture message may be a message including a picture, a link address of a picture, or a pre-appointed picture identifier. The link address of the picture may be used for downloading the corresponding picture, and the pre-appointed picture identifier may be used for downloading or locally selecting the corresponding picture. The picture may be a picture uploaded by a user or a picture existing on a server, and the picture may be a sticker picture. The red packet message may be operated and may trigger a resource transfer message after being operated. A resource is, for example, money, integrals, game coins, or physical prizes, and resource transfer is, for example, transfer of money, integrals, or game coins from one account to another account, or is, for example, change of owners of physical prizes.

S804: Receive a live broadcasting data stream initiated by a terminal corresponding to a first user identifier, the first user identifier being a user identifier initiating a live broadcast among participators of a group session.

Specifically, the first terminal may send the live broadcasting data stream to the server, so that the server sends the live broadcasting data stream to the second terminal corresponding to the second user identifier.

S806: Play the live broadcasting data stream on the group session interface.

In an embodiment, step S806 includes: using the live broadcasting data stream as a background of the group session interface for playing.

Specifically, the live broadcasting data stream includes an image data stream. The image data stream includes an image frame sequence. The second terminal uses the image frame sequence as the background of the group session interface frame by frame for playing, so that the image frame sequence forms a live broadcasting video. When playing the image frame sequence of the image data stream frame by frame, the second terminal may also synchronously play the audio data stream in the live broadcasting data stream. When playing the live broadcasting data stream, the second terminal may also present a microphone on/off control and/or a live broadcasting on/off control, turn on or turn off a microphone according to an operation on the microphone on/off control, and turn on or turn off, according to an operation on the live broadcasting on/off control, playing performed by using the live broadcasting data stream as the background of the group session interface.

Figure 9:
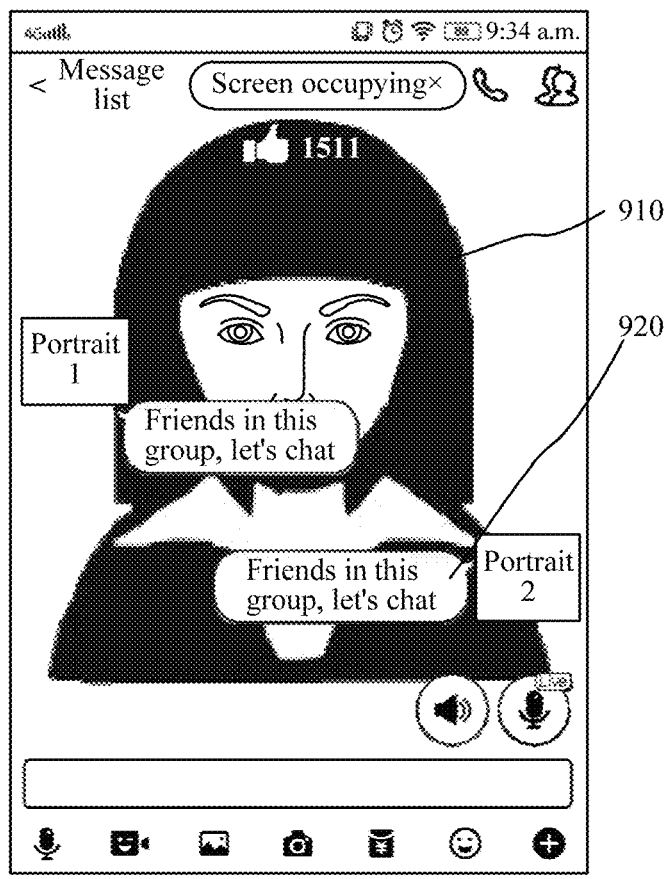
FIG. 9 is a schematic diagram of a group session interface according to still another embodiment.

For example, referring to FIG. 9, the live broadcasting data stream is played in the background of the group session interface presented by the second terminal, and a visual image 910 collected by the first terminal is presented. The second terminal covers the background 910 to present a message 920 generated in the group session.

In the foregoing method for presenting a live broadcasting data stream, a user represented by the first user identifier may initiate a live broadcast based on a group, and a user that participates in a session of the group and that is represented by the second user identifier may receive the live broadcasting data stream, implementing live broadcasting interaction based on the group; users participating in the group session may all perform live broadcasting interaction, thereby improving efficiency of the live broadcasting interaction. The group session interface is used for presenting the message generated in the session of the group, and the live broadcasting data stream is used as the background of the group session interface for playing; a user can not only perform asynchronous session interaction in a message form based on a group but also synchronously perform the live broadcasting interaction by using the background of the group session interface, thereby enriching user interaction forms and improving efficiency of information transfer between group users.

In an embodiment, the method for presenting a live broadcasting data stream further includes: when a radio access network is locally connected, performing step S804 and step S806; when a mobile data network is locally connected, receiving a screenshot captured from the live broadcasting data stream initiated by the terminal corresponding to the first user identifier and presenting the screenshot on the group session interface.

Specifically, the first terminal sends the live broadcasting data stream to the server, and the server may detect a network state of a second terminal corresponding to the second user identifier. If it is detected that the network state of the second terminal is being connected to the radio access network or being connected to a network in a wired manner, the live broadcasting data stream is directly sent to the second terminal. If it is detected that the network state of the second terminal is being connected to the mobile data network, the screenshot captured from the live broadcasting data stream is sent to the second terminal.

The screenshot may be any one or more image frames captured from the live broadcasting data stream, for example, may be the first image frame in the live broadcasting data stream. The screenshot may be captured from the live broadcasting data stream and sent to the second terminal every preset duration for presentation. Gaussian blur processing may be performed on the screenshot. The screenshot may match with a size of a screen of the second terminal. The radio access network may be specifically a network connected in a WiFi manner or a Wireless LAN authentication and privacy infrastructure (WAPI) manner. The mobile data network is a data network of a standard such as 2G (the second generation of mobile communication technology), 3G, or 4G.

Figure 10:
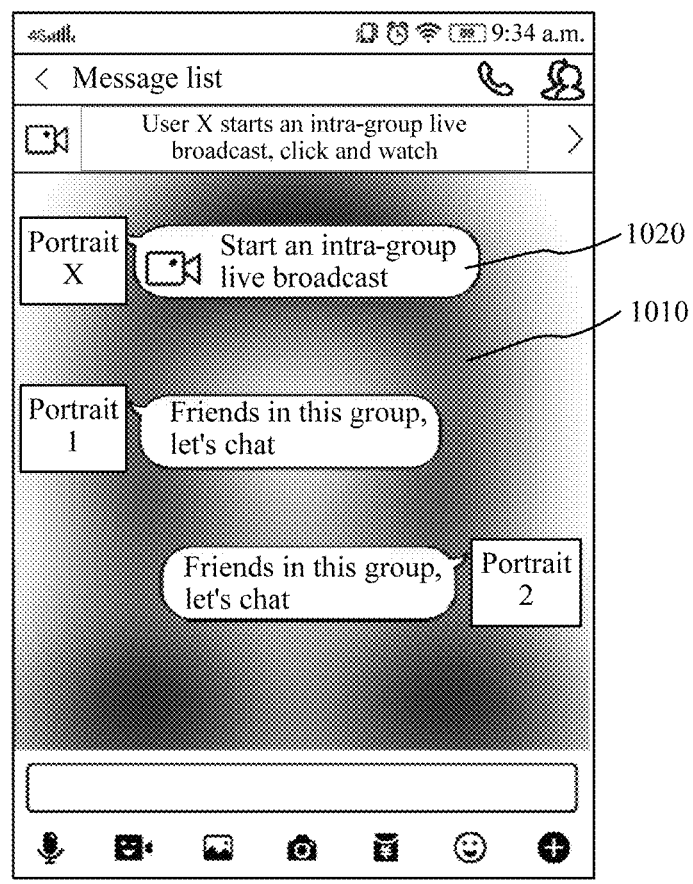
FIG. 10 is a schematic diagram of a group session interface according to yet another embodiment.

For example, referring to FIG. 10, the screenshot 1010 on which the Gaussian blur processing is performed is presented in the background in the group session interface of the second terminal. The second terminal presents a live broadcasting prompt 1020 in a message form and/or a live broadcasting prompt 1030 in a drop-down notification. The second terminal uses, according to a trigger operation on the live broadcasting prompt 1020 or 1030 in a manner shown in FIG. 9, the live broadcasting data stream as the background of the group session interface for playing.

In this embodiment, the live broadcasting data stream or the screenshot of the live broadcasting data stream may be pushed according to different network states of the second terminal. This is applicable to live broadcasting requirements of the second terminal in different network states.

Figure 11:
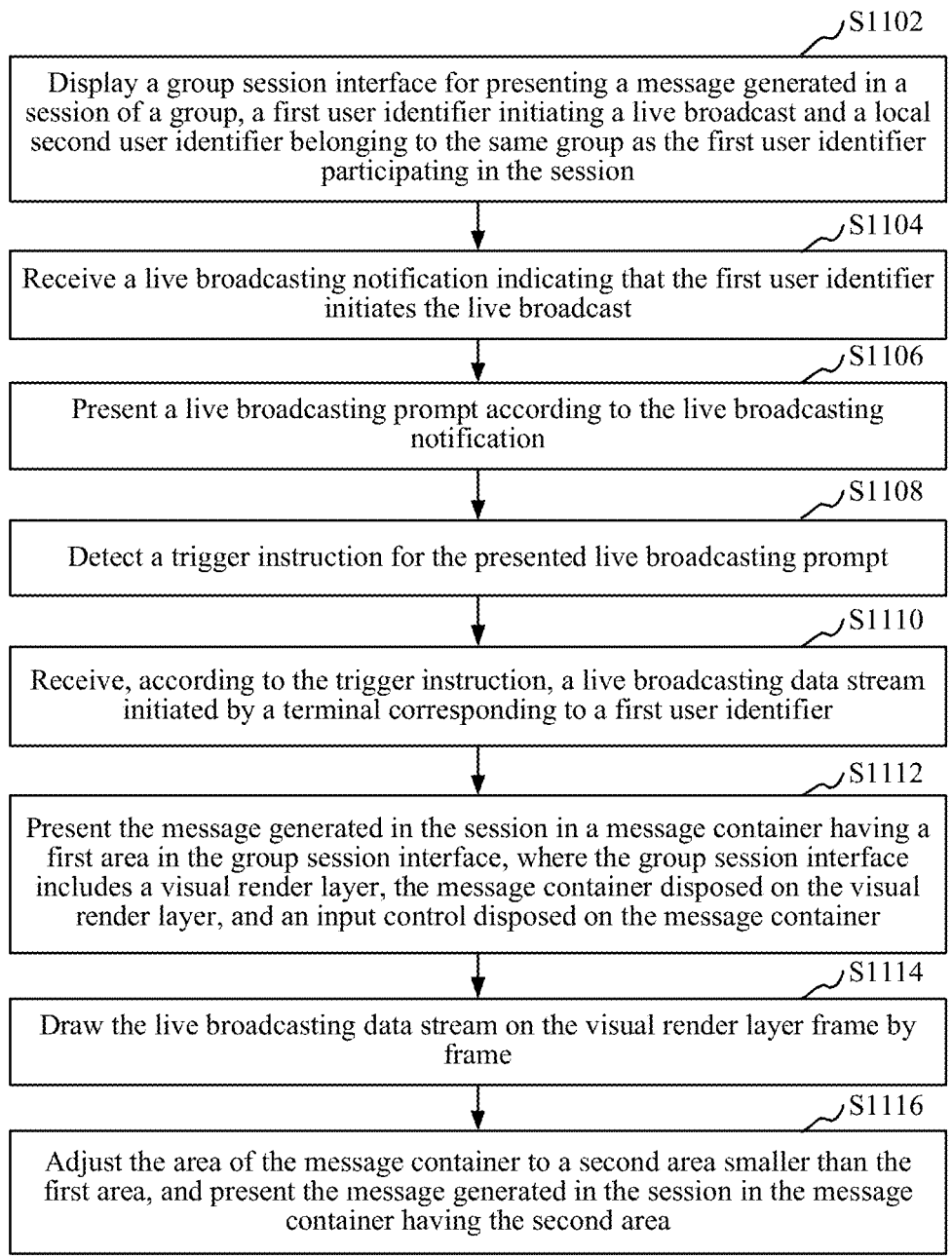
FIG. 11 is a schematic flowchart of a method for presenting a live broadcasting data stream according to another embodiment.

FIG. 11 is a schematic flowchart of a method for presenting a live broadcasting data stream according to another embodiment. Referring to FIG. 11, the method for presenting a live broadcasting data stream specifically includes the following steps:

S1102: Display a group session interface for presenting a message generated in a session of a group, a first user identifier initiating a live broadcast and a local second user identifier belonging to the same group as the first user identifier participating in the session.

S1104: Receive a live broadcasting notification indicating that the first user identifier initiates the live broadcast.

Figure 12:
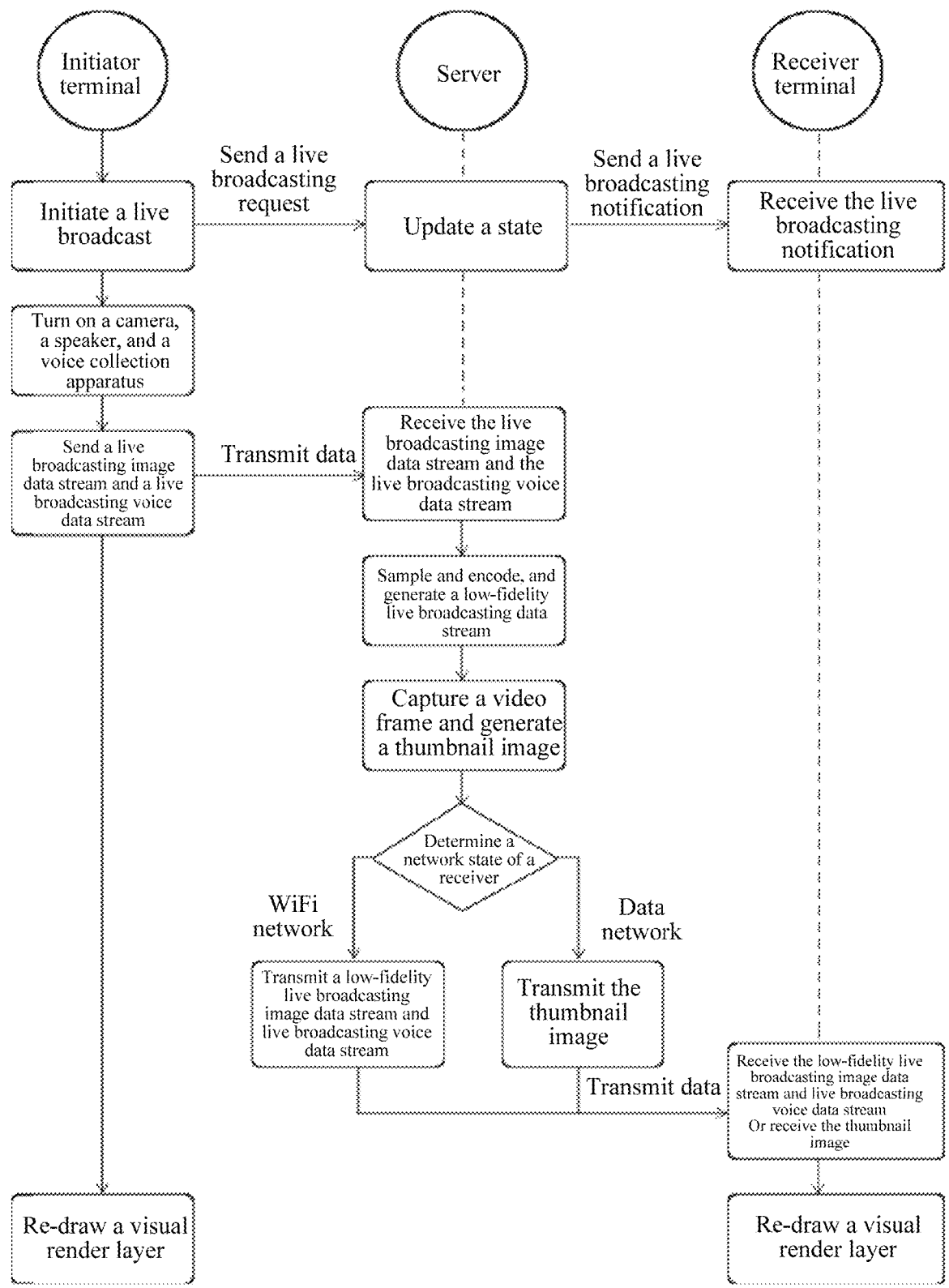
FIG. 12 is a schematic flowchart of synergy of a live broadcasting method and a method for presenting a live broadcasting data stream according to an embodiment.

The live broadcasting notification is used for indicating a user represented by the first user identifier initiates the live broadcast. FIG. 12 is a schematic flowchart of synergy of a live broadcasting method and a method for presenting a live broadcasting data stream according to an embodiment. Referring to FIG. 10, the first terminal may send a live broadcasting request carrying the first user identifier to a server. After receiving the live broadcasting request, the server sets the first user identifier to an anchor state, and sends the live broadcasting notification to second terminals corresponding to other second user identifiers participating in a session in a group. The second terminals receive the live broadcasting notification.

S1106: Present a live broadcasting prompt according to the live broadcasting notification.

The live broadcasting prompt refers to information for prompting a live broadcast within a user group. The live broadcasting prompt may be presented in a message form or may be presented in a drop-down notification.

S1108: Detect a trigger instruction for the presented live broadcasting prompt.

The second terminal may obtain trigger instruction for the presented live broadcasting prompt triggered in the group session interface. The group session interface is used for presenting the message generated in the session of the group. The second terminal may detect a trigger operation on the live broadcasting prompt, and trigger the corresponding trigger instruction when detecting the trigger operation. The trigger operation may be an operation on the presented live broadcasting prompt, for example, a touch operation or a cursor clicking operation on the presented live broadcasting prompt.

S1110: Receive, according to the trigger instruction, a live broadcasting data stream initiated by a terminal corresponding to a first user identifier.

Specifically, the second terminal may notify the server after obtaining the trigger instruction, so that the server sends a live broadcasting data stream initiated by a first terminal corresponding to the first user identifier to the second terminal.

S1112: Present the message generated in the session in a message container having a first area in the group session interface, where the group session interface includes a visual rendering layer, the message container disposed on the visual rendering layer, and an input control disposed on the message container.

Figure 13:
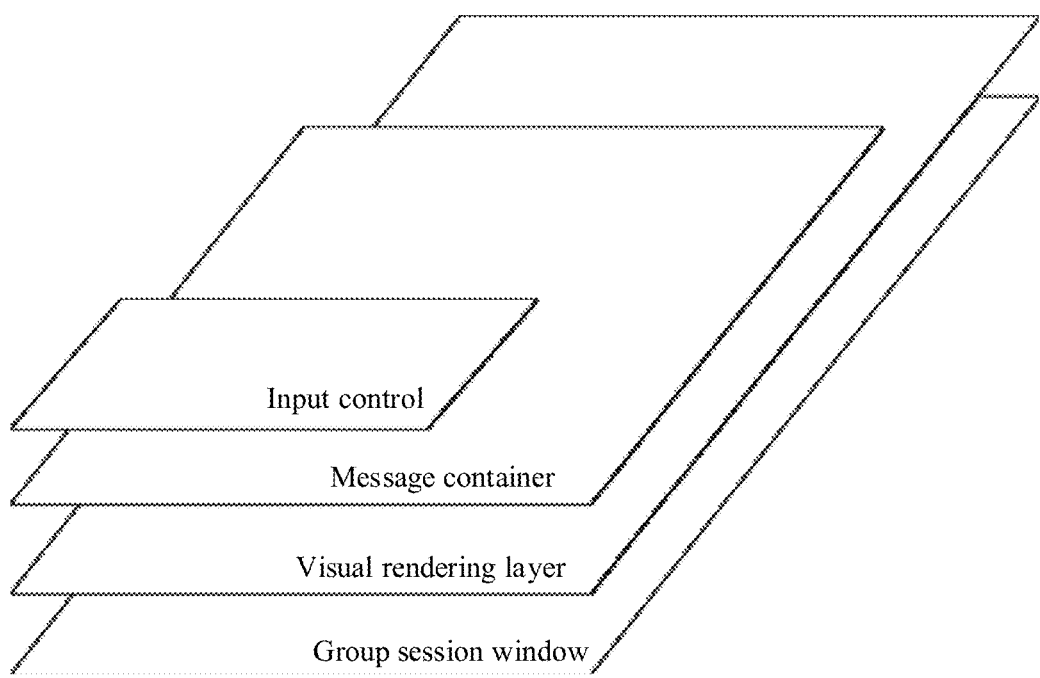
FIG. 13 is a schematic structural diagram of a group session interface according to an embodiment.

Referring to FIG. 13, the message container is a layer for containing the message generated in the session of the group, and the area of the message container is the first area. The message container may be rectangular, or round, or of an irregular shape. A region for presenting the message in the message container may be non-transparent, a region other than the region for presenting the message in the message container may be transparent or semi-transparent. The visual rendering layer is a layer for rendering a background of the group session interface. The input control is a control for inputting data, for example, the message input box 510 and the toolbar 520 in the group session interface shown in FIG. 5.

S1114: Draw the live broadcasting data stream on the visual rendering layer frame by frame.

Specifically, the group session interface includes the visual rendering layer, the message container disposed on the visual rendering layer, and the input control disposed on the message container. The input control may be configured to trigger a message, the message container may be configured to present the message, and the visual rendering layer may be configured to present a background. The first terminal re-draws an image frame sequence in the live broadcasting data stream frame by frame on the visual rendering layer, to use the live broadcasting data stream as a background of the group session interface for playing. In this embodiment, the group session interface is divided into different layers, and message triggering, message presentation, and playing of the live broadcasting data stream are separated, to facilitate message presentation and playing of the live broadcasting data stream.

S1116: Adjust the area of the message container to a second area smaller than the first area, and present the message generated in the session in the message container having the second area.

The second terminal may reduce the message container according to the group live broadcasting initiation instruction, and the area of the reduced message container is the second area. Reducing of the message container may be specifically decreasing of the height and/or width of the message container. In this embodiment, the message generated in the session is presented in the message container having the second area, so that a sufficient spare region can be prepared to present the live broadcasting data stream.

In an embodiment, the second terminal presents in the message container having the second area messages that are already generated and are subsequently generated in the session. In the messages generated in the session, messages whose message times are closer to a current time display higher priority in the message container. The message time may be a message sending time or a message receiving time. If an area occupied by messages contained in the message container having the first area is greater than the second area, the second terminal may hide or delete messages with low priority in the message container having the first area according to the second area. In this embodiment, the messages with low priority are hidden or deleted, ensuring a sufficient spare region for presenting the live broadcasting data stream and also ensuring that a latest message can be presented.

In an embodiment, in the second terminal, along a direction of the message container having the second area to a region in which the message container is originally located but in which the message container is not located after being reduced, messages presented in the message container having the second area gradually become transparent. In this embodiment, in a region that gradually becomes transparent, a user can not only see the played live broadcasting data stream but also check the messages, so as to transfer a larger amount of information.

In the foregoing method for presenting a live broadcasting data stream, the message generated in the session is presented in the message container having the second area, so that a sufficient spare region can be prepared to present the live broadcasting data stream. The group session interface is divided into different layers, and message triggering, message presentation, and playing of the live broadcasting data stream are separated, to facilitate message presentation and playing of the live broadcasting data stream.

Figure 14:
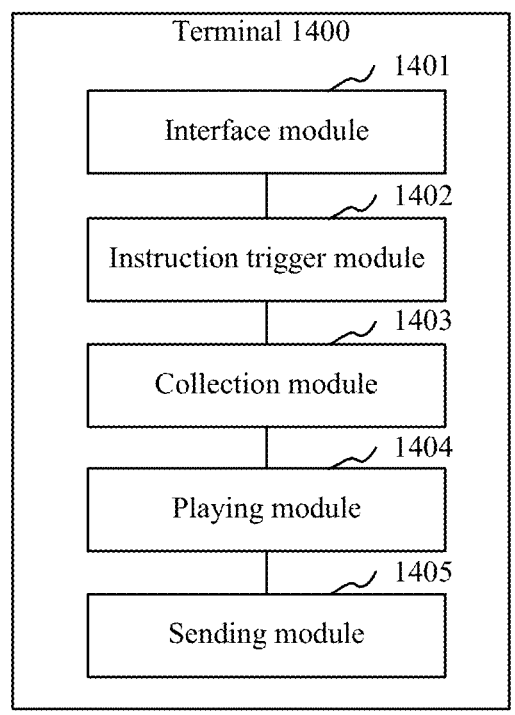
FIG. 14 is a structural block diagram of a terminal according to an embodiment.

FIG. 14 is a structural block diagram of a terminal 1400 according to an embodiment. An internal structure of the terminal may correspond to a structure shown in FIG. 2, and all or some of the following modules may be implemented by using software, hardware, or a combination thereof. Referring to FIG. 14, the terminal 1400 includes an interface module 1401, an instruction trigger module 1402, a collection module 1403, a playing module 1404, and a sending module 1405.

The interface module 1401 is configured to display a group session interface.

The instruction trigger module 1402 is configured to obtain a group live broadcasting initiation instruction based on the group session interface.

The collection module 1403 is configured to collect a live broadcasting data stream according to the group live broadcasting initiation instruction.

The playing module 1404 is configured to play the live broadcasting data stream on the group session interface.

The sending module 1405 is configured to send the live broadcasting data stream to a terminal corresponding to a second user identifier participating in a group session.

In the method for presenting a live broadcasting data stream, users participating in the group session implement live broadcasting interaction based on a group, and the users participating in the group session may all perform the live broadcasting interaction, thereby improving efficiency of the live broadcasting interaction. The users can not only perform asynchronous session interaction in a message form based on a group but also synchronously perform the live broadcasting interaction, thereby enriching user interaction forms and improving efficiency of information transfer between group users.

In an embodiment, the interface module 1401 is further configured to: after obtaining the group live broadcasting initiation instruction based on the group session interface, reduce an area of a message container in the group session interface, where the message container is used for presenting a message generated by the group session.

In an embodiment, the playing module 1404 is further configured to use the live broadcasting data stream as a background of the group session interface for playing.

In an embodiment, the group session interface includes a visual rendering layer, the message container disposed on the visual rendering layer, and an input control disposed on the message container. The playing module 1404 is further configured to draw the live broadcasting data stream on the visual rendering layer frame by frame. In this embodiment, the group session interface is divided into different layers, and message triggering, message presentation, and playing of the live broadcasting data stream are separated, to facilitate message presentation and playing of the live broadcasting data stream.

In an embodiment, the sending module 1405 is further configured to send the live broadcasting data stream to a server, so that the server sends the live broadcasting data stream to a terminal when the terminal corresponding to the second user identifier is connected to a radio access network, and sends a screenshot captured from the live broadcasting data stream to the terminal when the terminal is connected to a mobile data network. In this embodiment, the live broadcasting data stream or the screenshot of the live broadcasting data stream is pushed according to different network states of the second terminal. This is applicable to live broadcasting requirements of the second terminal in different network states.

Figure 15:
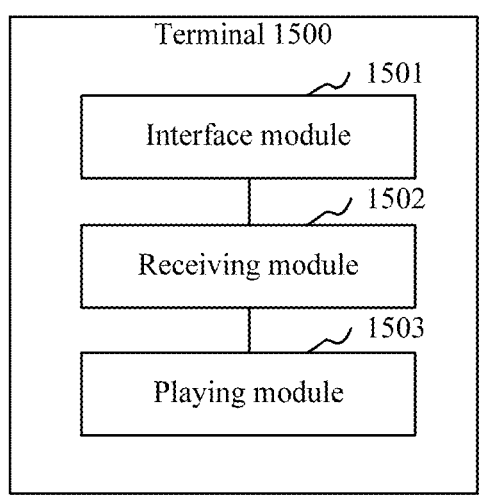
FIG. 15 is a structural block diagram of a terminal according to another embodiment.

FIG. 15 is a structural block diagram of a terminal 1500 according to an embodiment. An internal structure of the terminal may correspond to a structure shown in FIG. 2, and all or some of the following modules may be implemented by using software, hardware, or a combination thereof. Modules having same names in the terminal 1500 and the terminal 1400 may be same or different modules. As shown in FIG. 15, the terminal 1500 includes:

an interface module 1501, configured to display a group session interface;

a receiving module 1502, configured to receive a live broadcasting data stream initiated by a terminal corresponding to a first user identifier, the first user identifier being a user identifier initiating a live broadcast among participators of a group session; and a playing module 1503, configured to play the live broadcasting data stream on the group session interface.

In an embodiment, the interface module 1501 is further configured to: before receiving the live broadcasting data stream initiated by the terminal corresponding to the first user identifier, receive a live broadcasting notification indicating that the first user identifier initiates a live broadcast; and present a live broadcasting prompt according to the live broadcasting notification.

The receiving module 1502 is further configured to detect a trigger instruction for the presented live broadcasting prompt; and receive, according to the trigger instruction, the live broadcasting data stream initiated by the terminal corresponding to the first user identifier.

In an embodiment, the interface module 1501 is further configured to: playing the live broadcasting data stream on the group session interface, reduce an area of a message container in the group session interface, where the message container is used for presenting a message generated by the group session.

In an embodiment, the interface module 1501 is further configured to: before using the live broadcasting data stream as the background of the group session interface for playing, present the message generated in the session in a message container having a first area in the group session interface; and after using the live broadcasting data stream as the background of the group session interface for playing, adjust the area of the message container to a second area smaller than the first area, and present the message generated in the session in the message container having the second area. In this embodiment, the message generated in the session is presented in the message container having the second area, so that a sufficient spare region can be prepared to present the live broadcasting data stream.

In an embodiment, the group session interface includes a visual rendering layer, the message container disposed on the visual rendering layer, and an input control disposed on the message container. The playing module 1503 is further configured to draw the live broadcasting data stream on the visual rendering layer frame by frame. In this embodiment, the group session interface is divided into different layers, and message triggering, message presentation, and playing of the live broadcasting data stream are separated, to facilitate message presentation and playing of the live broadcasting data stream.

In an embodiment, the receiving module 1502 is further configured to receive the live broadcasting data stream initiated by the terminal corresponding to the first user identifier when a radio access network is locally connected. The receiving module 1502 is configured to: when a mobile data network is locally connected, receive a screenshot captured from the live broadcasting data stream initiated by the terminal corresponding to the first user identifier, and the playing module 1503 is further configured to present the screenshot on the group session interface. In this embodiment, the live broadcasting data stream or the screenshot of the live broadcasting data stream may be pushed according to different network states of the second terminal. This is applicable to live broadcasting requirements of the second terminal in different network states.

In some embodiments, the terminal 1400 and terminal 1500 may be the same terminal implementing different functions. That is, a terminal logged in with a first user identifier can initiate a first group session, collect first live broadcasting data stream, and send the first live broadcasting data stream to other terminal(s) participating the first group session (e.g., a terminal corresponding to a second user identifier). The same terminal may also participate a second group session initiated by another terminal (e.g., a terminal corresponding to a third user identifier), and play second live broadcasting data stream received from the terminal corresponding to the third user identifier.

In an embodiment, a terminal includes a memory and a processor, the memory storing computer readable instructions, and the computer readable instructions making the processor perform the following steps when being executed by the processor: displaying a group session interface; obtaining a group live broadcasting initiation instruction based on the group session interface; collecting a live broadcasting data stream according to the group live broadcasting initiation instruction; playing the live broadcasting data stream on the group session interface; and sending the live broadcasting data stream to a terminal corresponding to a second user identifier participating in a group session.

In an embodiment, after the obtaining a group live broadcasting initiation instruction based on the group session interface, the computer readable instructions further make the processor execute: reducing an area of a message container in the group session interface, where the message container is used for presenting a message generated by the group session.

In an embodiment, the group session interface includes a visual rendering layer, the message container disposed on the visual rendering layer, and an input control disposed on the message container; and the playing the live broadcasting data stream on the group session interface includes: drawing the live broadcasting data stream on the visual rendering layer frame by frame.

In an embodiment, the sending the live broadcasting data stream to a terminal corresponding to a second user identifier participating in a group session includes:

sending the live broadcasting data stream to a server, so that the server sends the live broadcasting data stream to the terminal when the terminal corresponding to the second user identifier participating in the group session is connected to a radio access network, and sends a screenshot captured from the live broadcasting data stream to the terminal when the terminal is connected to a mobile data network.

In an embodiment, the message generated in the session includes at least one of a text message, an audio message, a video message, a picture message, and a red packet message.

In the foregoing terminal, users participating in the group session implement group-based live broadcasting interaction, and the users participating in the group session may all perform the live broadcasting interaction, thereby improving efficiency of the live broadcasting interaction. The users can not only perform asynchronous session interaction in a message form based on a group but also synchronously perform the live broadcasting interaction, thereby enriching user interaction forms and improving efficiency of information transfer between group users.

In an embodiment, a terminal is provided, including a memory and a processor, the memory storing computer readable instructions, and the computer readable instructions making the processor perform the following steps when being executed by the processor: displaying a group session interface; receiving a live broadcasting data stream initiated by a terminal corresponding to a first user identifier, the first user identifier being a user identifier initiating a live broadcast among participators of a group session; and playing the live broadcasting data stream on the group session interface.

In an embodiment, the receiving a live broadcasting data stream initiated by a terminal corresponding to a first user identifier includes: receiving a live broadcasting notification indicating that the first user identifier initiates a live broadcast; presenting a live broadcasting prompt according to the live broadcasting notification; detecting a trigger instruction for the presented live broadcasting prompt; and in response to the trigger instruction, receiving the live broadcasting data stream initiated by the terminal corresponding to the first user identifier.

In an embodiment, the computer readable instructions further make the processor execute: reducing an area of a message container in the group session interface when playing the live broadcasting data stream on the group session interface, where the message container is used for presenting a message generated by the group session.

In an embodiment, the group session interface includes a visual rendering layer, the message container disposed on the visual rendering layer, and an input control disposed on the message container; and the playing the live broadcasting data stream on the group session interface includes: drawing the live broadcasting data stream on the visual rendering layer frame by frame.

In an embodiment, the computer readable instructions further make the processor execute: performing the step of receiving a live broadcasting data stream initiated by a terminal corresponding to a first user identifier and the step of playing the live broadcasting data stream on the group session interface when connected to a network other than a mobile data network; and receiving a screenshot captured from the live broadcasting data stream initiated by the terminal corresponding to the first user identifier and presenting the screenshot on the group session interface when connected to a mobile data network.

In the foregoing terminal, users participating in the group session implement group-based live broadcasting interaction, and the users participating in the group session may all perform the live broadcasting interaction, thereby improving efficiency of the live broadcasting interaction. The users can not only perform asynchronous session interaction in a message form based on a group but also synchronously perform the live broadcasting interaction, thereby enriching user interaction forms and improving efficiency of information transfer between group users.

A person of ordinary skill in the art may understand that all or some of the processes of the methods of the foregoing embodiments may be implemented by a computer program instructing relevant hardware. The program may be stored in a non-volatile computer readable storage medium. When the program is executed, the program may include the processes of the embodiments of the foregoing methods. The storage medium may be a magnetic disk, an optical disc, a read-only memory (ROM), or the like.

Technical features of the foregoing embodiments may be randomly combined. To make description concise, not all possible combinations of the technical features in the foregoing embodiments are described. However, as long as combinations of these technical features do not contradict each other, it should be considered that the combinations all fall within the scope recorded by this specification.

The foregoing embodiments describe only several implementations of this application, which are described specifically and in detail, and therefore cannot be construed as a limitation to the patent scope of the present disclosure. It should be noted that a person of ordinary skill in the art may make various changes and improvements without departing from the ideas of this application, which shall all fall within the protection scope of this application. Therefore, the protection scope of the patent of this application shall be subject to the appended claims.

What is claimed is:

1. A live broadcasting method, comprising:
   displaying, by a first terminal corresponding to a first user identifier in a group session, a group session interface;
   collecting, by the first terminal, a live broadcasting data stream;
   sending, by the first terminal, the live broadcasting data stream to a server for the server to determine a network state of a second terminal corresponding to a second user identifier in the group session;
   in response to determining by the server that the network state of the second terminal is a network other than a mobile data network, facilitating, by the first terminal, sending of the live broadcasting data stream to the second terminal; and
   in response to determining the network state of the second terminal is the mobile data network, facilitating, by the first terminal, sending of a screenshot of the live broadcasting data stream to the second terminal.

2. The live broadcasting method according to claim 1, further comprising:
   facilitating, by the first terminal, a blur processing performed on the screenshot to generate a blurred screenshot; and
   facilitating, by the first terminal, sending of the blurred screenshot to the second terminal.

3. The live broadcasting method according to claim 1, further comprising:
   facilitating, by the first terminal, converting of the live broadcasting data stream to a low-fidelity live data stream; and
   facilitating, by the first terminal, sending of the low-fidelity live data stream to the second terminal.

4. The live broadcasting method according to claim 1, further comprising:
   prior to collecting the live broadcasting data stream, presenting, by the first terminal, a message container on the group session interface, the message container covering a first area of the group session interface; and
   after displaying on the group session interface the live broadcasting data stream or the screenshot of the live broadcasting data stream, converting, by the first terminal, the message container to a reduced message container, the reduced message container covering a second area of the group session interface, wherein the second area is smaller than the first area but greater than zero, and wherein the first terminal and the second terminal message each other via the message container prior to the collecting the live broadcasting data, and continue to message each other via the reduced message container after the live broadcasting data or the screenshot of the live broadcasting data stream is displayed on the group session interface.

5. The live broadcasting method according to claim 1, wherein facilitating, by the first terminal, sending of the screenshot of the live broadcasting data stream to the second terminal includes:
   facilitating, by the first terminal, sending of a plurality of screenshots of the live broadcasting data stream every preset duration to the second terminal.

6. The live broadcasting method according to claim 1, further comprising:
   facilitating, by the first terminal, displaying the live broadcasting data stream or the screenshot of the live broadcasting data stream at a background layer of a second group session interface of the second terminal; and
   facilitating, by the first terminal, displaying a second message container on top of the background layer, wherein the second message container includes two or more message boxes separate from each other.

7. A method for presenting a live broadcasting data stream, comprising:
   displaying, by a computing device participating in a group session, a group session interface, the group session further including a terminal corresponding to a first user identifier, the first user identifier being a user identifier initiating a live broadcast among participators of the group session and collecting a live broadcasting data stream to be sent to a server, wherein the server determines a network state of the computing device;
   receiving, by the computing device, the live broadcasting data stream in response to the server's determining that the network state of the computing terminal is a network other than a mobile data network; and
   receiving, by the computing device, a screenshot of the live broadcasting data stream in response to the server's determining that the network state of the computing terminal is the mobile data network.

8. The method according to claim 7, further comprising:
   receiving, by the computing device, a blurred screenshot obtained by a blur processing performed on the screenshot.

9. The according to claim 7, further comprising:
   receiving, by the computing device, a low-fidelity live data stream converted from the live broadcasting data stream.

10. The according to claim 7, further comprising:
    prior to receiving the live broadcasting data stream or the screenshot of the live broadcasting data stream, presenting a message container on the group session interface, the message container covering a first area of the group session interface; and
    after displaying on the group session interface the live broadcasting data stream or the screenshot of the live broadcasting data stream, converting the message container to a reduced message container, the reduced message container covering a second area of the group session interface, wherein the second area is smaller than the first area but greater than zero, and wherein the computing device and the terminal message each other via the message container prior to the receiving the live broadcasting data or the screenshot of the live broadcasting data stream, and continue to message each other via the reduced message container after the live broadcasting data or the screenshot of the live broadcasting data stream is displayed on the group session interface.

11. The according to claim 7, wherein receiving, by the computing device, the screenshot of the live broadcasting data stream includes:
    receiving, by the computing device, a plurality of screenshots of the live broadcasting data stream every preset duration.

12. The method according to claim 7, further comprising:
    displaying, by the computing device, the live broadcasting data stream or the screenshot of the live broadcasting data stream at a background layer of a group session interface of the computing device; and
    displaying, by the computing device, a message container on top of the background layer, wherein the message container includes two or more message boxes separate from each other.

13. A live broadcasting apparatus, comprising a memory and a processor, the memory storing computer readable instructions, and the computer readable instructions, upon being executed by the processor, causing the processor to perform:
    displaying a first group session interface, the apparatus corresponding to a first user identifier in a first group session;
    collecting a first live broadcasting data stream;
    sending the first live broadcasting data stream to a server for the server to determine a network state of a second terminal corresponding to a second user identifier in the first group session;
    in response to determining by the server that the network state of the second terminal is a network other than a mobile data network, facilitating sending of the first live broadcasting data stream to the second terminal; and
    in response to determining by the server that the network state of the second terminal is the mobile data network, facilitating, sending of a screenshot of the first live broadcasting data stream to the second terminal.

14. The apparatus according to claim 13, wherein the computer readable instructions further cause the processor to execute:
    displaying a second group session interface of a second group session;

receiving a second live broadcasting data stream initiated by a third terminal corresponding to a third user identifier in the second group session; and playing the second live broadcasting data stream on the second group session interface.

15. The apparatus according to claim 14, wherein the computer readable instructions further cause the processor to execute:

playing the second live broadcasting data stream on the second group session interface in response to the apparatus being connected to a network other than a second mobile data network; and receiving a second screenshot captured from the second live broadcasting data stream and presenting the screenshot on the second group session interface in response to the apparatus being connected to the second mobile data network.

16. The apparatus according to claim 13, wherein the computer readable instructions further cause the processor to execute:

facilitating a blur processing performed on the screenshot to generate a blurred screenshot; and facilitating sending of the blurred screenshot to the second terminal.

17. The apparatus according to claim 13, wherein the computer readable instructions further cause the processor to execute:

facilitating converting of the live broadcasting data stream to a low-fidelity live data stream; and facilitating sending of the low-fidelity live data stream to the second terminal.

18. The apparatus according to claim 13, wherein the computer readable instructions further cause the processor to execute:

prior to collecting the first live broadcasting data stream, presenting a message container on the first group session interface, the message container covering a first area of the first group session interface; and after displaying on the first group session interface the first live broadcasting data stream or the screenshot of the first live broadcasting data stream, converting the message container to a reduced message container, the reduced message container covering a second area of the first group session interface, wherein the second area is smaller than the first area but greater than zero, and wherein the apparatus and the second terminal message each other via the message container prior to the collecting the first live broadcasting data, and continue to message each other via the reduced message container after the first live broadcasting data or the screenshot of the first live broadcasting data stream is displayed on the first group session interface.

19. The apparatus according to claim 13, wherein facilitating sending of the screenshot of the first live broadcasting data stream to the second terminal includes:

facilitating sending of a plurality of screenshots of the first live broadcasting data stream every preset duration to the second terminal.

20. The apparatus according to claim 13, wherein the computer readable instructions further cause the processor to execute:

facilitating displaying the first live broadcasting data stream or the screenshot of the first live broadcasting data stream at a background layer of a second group session interface of the second terminal; and facilitating displaying a second message container on top of the background layer, wherein the second message container includes two or more message boxes separate from each other.

\* \* \* \* \*